Oct. 11, 1960

C. LUZ 2,955,511

PHOTOGRAPHIC PRINTING EASEL

Filed Aug. 29, 1957

INVENTOR.
Christian Luz
BY Benj. T. Tauber
his attorney

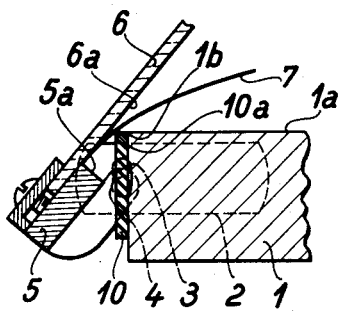
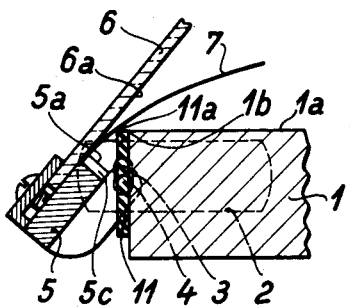
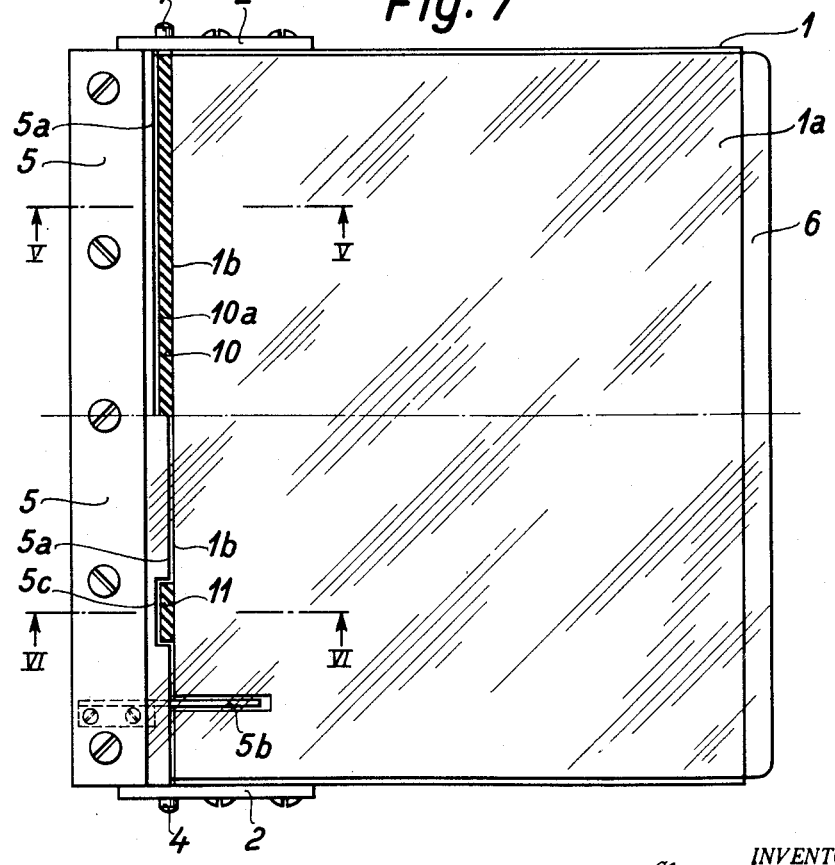

United States Patent Office 2,955,511
Patented Oct. 11, 1960

2,955,511

PHOTOGRAPHIC PRINTING EASEL

Christian Lùz, Wetzlar, Lahn, Germany, assignor to Ernst Leitz, G.m.b.H., Wetzlar, Germany, a corporation of Germany Filed Aug. 29, 1957, Ser. No. 680,962

Claims priority, application Germany Sept. 5, 1956

5 Claims. (Cl. 88—24)

My invention relates to a photographic printing easel for photographic purposes and more particularly for the printing of enlargements or copies of photographs.

In easels for photo copying a photo-sensitive sheet is placed on a base plate and is then held in fixed position thereon by a glass plate which during replacement of the sheet is tilted upwardly and after replacement is lowered to hold the sheet in position. In order that the copy material may be properly placed on the photo-sensitive sheet it is necessary that this sheet be placed and held accurately in a fixed position on the base plate of the easel. Heretofore various means have been provided for accomplishing this, such as oriented abutments extending above the surface of the base plate depressible against a spring action when the glass plate is closed down to hold the photo-sensitive sheet in position. In such apparatus the photo-sensitive sheet may, however, be improperly placed or it may shift from its placed position upon the lowering of the glass plate or other clamping plate.

My invention provides an easel in which the photo-sensitive sheet is automatically placed in its proper position upon the lowering of the glass plate and is held securely on the base plate in proper position when the glass plate is completely lowered or closed.

In my invention the glass plate extends rearwardly of an edge of the base plate and is hinged to the base in such manner that when it is lifted completely upwardly its undersurface is slightly spaced from this rear edge so that a photo-sensitive sheet may be slipped over the base plate and through the space into an abutment on the undersurface parallel to the rear edge of the base plate and to the axis of swinging of the closed plate or cover plate.

When the glass plate is lowered or tilted downwardly its undersurface immediately above the rear edge comes to rest on the rear edge thus pressing the copying sheet onto the supporting edge of the base. This supporting edge has a coefficient of friction somewhat greater than that of the glass plate so that it offers sufficient resistance to the sliding of the photo-sensitive sheet to force this sheet into alignment with the spaced abutment until the glass plate is completely lowered in position with the abutment close against the rear edge. This insures that the photo-sensitive sheet cannot be displaced from a position of parallelism with the rear edge of the base plate, and also that if it should not be placed in such parallel arrangement when inserted through the space between the rear edge of the base and the undersurface of the glass plate, it will be moved to such parallel position as the plate is lowered. Any suitable means for providing and insuring the necessary frictional resistance to sliding of the photo-sensitive sheet over the rear edge may be provided by having an insert or a succession of inserts at this rear edge of materials or appropriate frictional resistance or coefficient of friction. Such material may, for example, be suitable elastic deformable material of selected frictional resistance such as plastic, rubber or other elastomer.

To insure that the photo-sensitive sheet shall occupy the correct sidewise position an abutment may be provided on the undersurface of the glass plate at one side of the area on which the photo-sensitive sheet is to be supported so that in placing the sheet it may be placed against this side abutment. A suitable recess may be provided in the base plate into which the abutment may be received when the glass plate is lowered to closed position.

In a preferred embodiment of the invention the glass plate is supported in the above manner by means of a pair of pins carried on brackets one at each side of the glass plate below the surface and extending into vertically elongated slots in a bracket respectively on each of the side edges of the base plate. These slots are so placed that when the glass plate is lifted nearly to its full open position the pins will rest on the lower edge of the slot and upon further tilting upwardly of the glass plate the glass plate will be lifted free of the edge of the base plate to form the space for the insertion of the photo-sensitive sheet. As the glass plate is lowered its lower surface will rest on the rear edge of the base and upon further lowering will slide forwardly and downwardly while the pins rise upwardly in their supporting slots.

The various features of my invention are illustrated by way of example in the accompanying drawings, in which:

Fig. 5 is a part section of an easel with an arrangement of a covering of high sliding resistance along the upper base plate edge;

Fig. 6 is a part section of an easel with a series of inserts of high sliding resistance arranged on the upper base plate edge; and, Fig. 7 is a plan of an easel partly according to Fig. 5 and partly according to Fig. 6.

Figure 1:
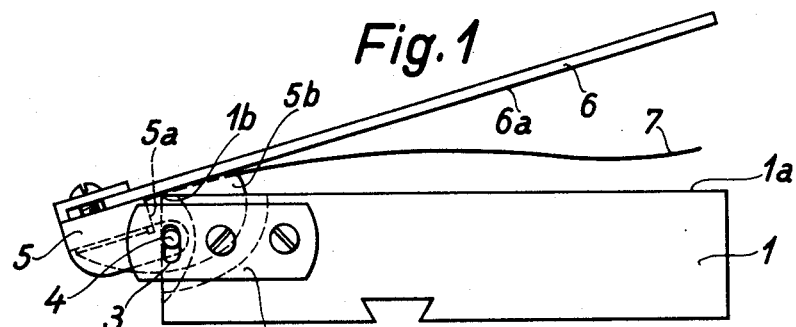
Fig. 1 is a side elevation of a photographic printing easel embodying one form of the invention.
Figure 2:
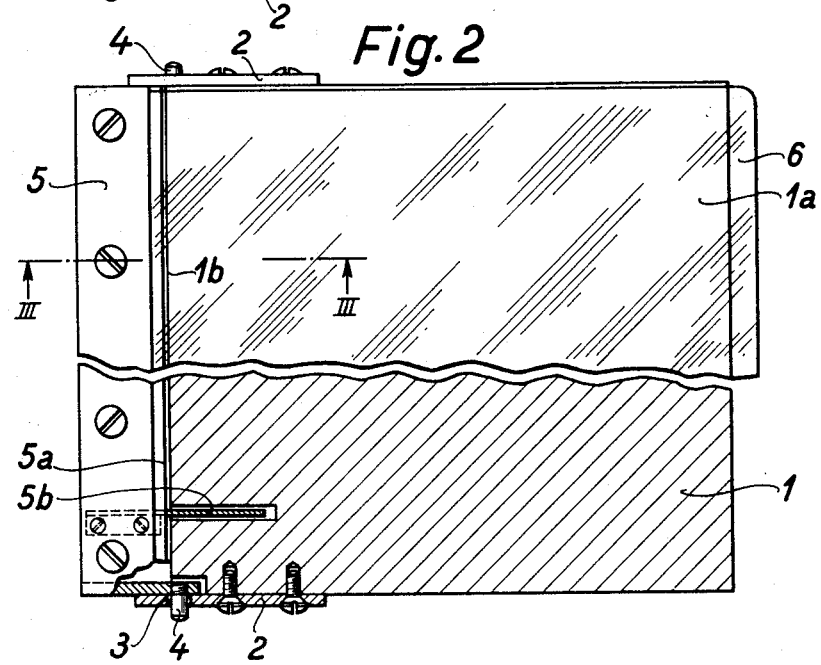
Fig. 2 is a plan of the easel, part being broken away to a horizontal section.

Referring to Figs. 1 and 2, the base plate 1 of the easel is provided with two sidewise mounted bearing plates 2. Each bearing plate has a vertical slot 3 to receive an axial trunnion 4 of a mounting 5 of a glass plate 6. The slots 3 and the axial trunnions engaging in them are below the copying surface 1a of the base plate.

The glass plate mounting 5 is provided with an abutment surface 5a parallel to the trunnions 4 which closes against the under surface 6a of the glass plate 6 (Figs. 3 and 4) and, in the closed position of the glass plate 1 as well as in the open position, extends under the plane of the sheet supporting surface 1a of the base plate 1.

In order to build an orienting edge for a photo-sensitive sheet 7 to be brought onto the base plate 1, the glass plate mounting 5 is provided with an additional abutment 5b which is arranged normal to the abutment surface 5a and is also joined to the lower surface of the glass plate 6a (Fig. 2) and also in the closed position as well as in the open position of the glass plate extends under the supporting surface 1a of the base plate.

Figure 3:
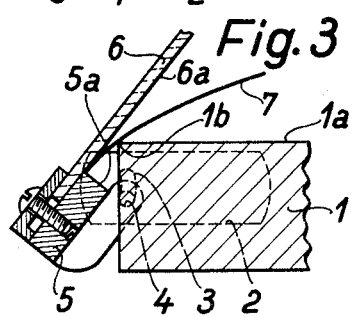
Fig. 3 is a vertical section of a portion of the easel with a high hinged glass plate.
Figure 4:
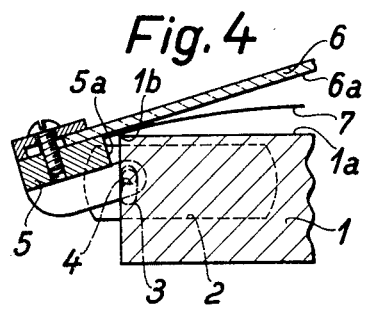
Fig. 4 is a similar section with the glass plate in an intermediate position relative to the base plate of the easel.

The operation of the copying board is as follows:

In introducing a photo-sensitive sheet 7 the glass plate is raised to the position shown in Fig. 3. In this position a space is formed between the upper, axis-parallel, edge 1b of the base plate and the under side 6a of the plate into which the photo-sensitive sheet 7 may be slid in such manner that it lies against the abutment surfaces 5a and 5b. The sheet 7 in this position lies on one side against the underside 6a of the glass plate 6 and on the other side against the axis-parallel upper edge 1b of the base plate 1. Upon lowering the glass plate 6 the under side 6a lies with the inter-positioned sheet against the axis-parallel edge 1b of the base plate and turns around this edge 1b as a turning axis with simultaneous positioning of the axial trunnions in the slots 3. Through this clamping between the upper edge 1b of the base plate 1 and the under side 6a of the glass plate 6 an uncontrolled shifting of the sheet on closing down of the glass plate 6 is avoided. The resistance to sliding on the base board edge 1b moreover causes the sheet edge to remain in abutment with the abutment surface 5a of the glass plate holder 5. It will be slid by the abutment surface 5a into its correct position on the base plate 1. With the glass plate 6 turned down fully onto the base plate 1, the sheet 7, held by the glass plate 6 loaded onto it, is in a position oriented by the abutment surfaces 5a and 5b on the supporting surface 1a of the base plate 1.

In the embodiments of Figs. 5 and 7 a special strip 10 of a suitable elastic, deformable, material of high frictional resistance, such as a plastic, rubber, or the like, is arranged at the axis-parallel upper edge 1b of the base plate 1. It forms against the abutment surface 5a of the glass plate mounting 5 the axis parallel side surface of the base plate. For the operation of the apparatus with this construction, the axis-parallel loading edge 10a works in place of the base plate upper edge 1b. With the elastic deformability present in this arrangement, the strip can also simultaneously act as the positioning edge for the under side 6a of the glass plate. The operation of this embodiment corresponds otherwise to that of the embodiment exemplified in Figs. 1–4 except that, because of the strip 10 of material of high frictional resistance and in the given cases of elastic deformability, the mounting of the sheet 7 upon insertion and its orientation relative to the abutment surface 5a is still improved.

In the form of embodiment shown in Figs. 6 and 7, in place of a continuous strip 10 of high frictional resistance, several pads 11 of a material of high frictional resistance and preferably of elastic deformability are provided which, as the glass plate 6 is lowered to closed position, enter complementary notches 5c of the glass plate mounting 5. The manner of operation of this embodiment corresponds with that of Figs. 5 and 7.

The invention has been described on the basis of an easel for borderless enlargement. It is, however, also applicable to easels with border covers in which in a given instance also the abutments 5a and 5b can be adjusted to accommodate various border widths.

Having described my invention, what I claim is:

1. Photographic printing easel which comprises a base plate having a flat, paper supporting surface and vertical guide means mounted on said base plate comprising two bearing plates sidewise mounted on said base plate, each of said bearing plates having a vertical guide slot, a transparent cover plate mounted on said base plate to tilt on and slide on the edge of said base plate to the upper position free from the supporting surface of said base plate to receive a photo-sensitive sheet between said edge and said cover plate and downwardly to engage said photo-sensitive sheet with said edge and to hold it flat on said supporting surface, and a guide element mounted on said cover plate at its under surface to engage said vertical guide means as said cover plate is tilted upwardly and downwardly to support said cover plate free from said base plate in fully open position for placing the photo-sensitive sheet in proper position on said supporting surface and at least one abutment depending from said cover plate beyond the edge of said base plate to engage an edge of said photo-sensitive sheet and to ride forwardly to the edge of said base plate when said cover plate is tilted downwardly to closed position thereby moving said photo-sensitive sheet to proper position on said supporting surface and holding it in place thereon.

2. Photographic printing easel of claim 1 in which said vertical guide means comprises a pair of plates one at each side of said base plate each having a vertically elongated slot and in which said guided element comprises a pair of aligned trunnions forwardly of said abutment and extending into said slots.

3. Photographic printing easel of claim 1 having a side abutment at right angles to the abutment of said cover plate mounted onto the lower surface of said cover plate to engage an edge of said photo-sensitive sheet at right angles to the edge engaged by said abutment and in which said base plate has a slot to receive said side abutment when said cover plate is lowered.

4. Photographic printing easel of claim 2 having an element of a higher frictional resistance than that of said base plate and secured to said base plate to form said edge on which said cover plate rides.

5. Photographic printing easel of claim 4 in which said element of higher frictional resistance is of elastomeric material.

References Cited in the file of this patent

UNITED STATES PATENTS

| | | |
|---|---|---|
| 1,894,005 | Rose | Jan. 10, 1933 |
| 2,110,279 | Sloan | Mar. 8, 1938 |
| 2,198,169 | Kallusch | Apr. 23, 1940 |
| 2,211,833 | Neuwirth | Aug. 20, 1940 |
| 2,223,264 | Moore | Nov. 26, 1940 |
| 2,496,701 | De Groff | Feb. 7, 1950 |
| 2,554,712 | Maxwell | May 29, 1951 |

FOREIGN PATENTS

| | | |
|---|---|---|
| 514,135 | Italy | Feb. 8, 1955 |